Oct. 11, 1927.  
W. J. COULTAS  
SHEAF CARRIER  
Filed Nov. 22, 1920  
1,644,874  
3 Sheets-Sheet 1
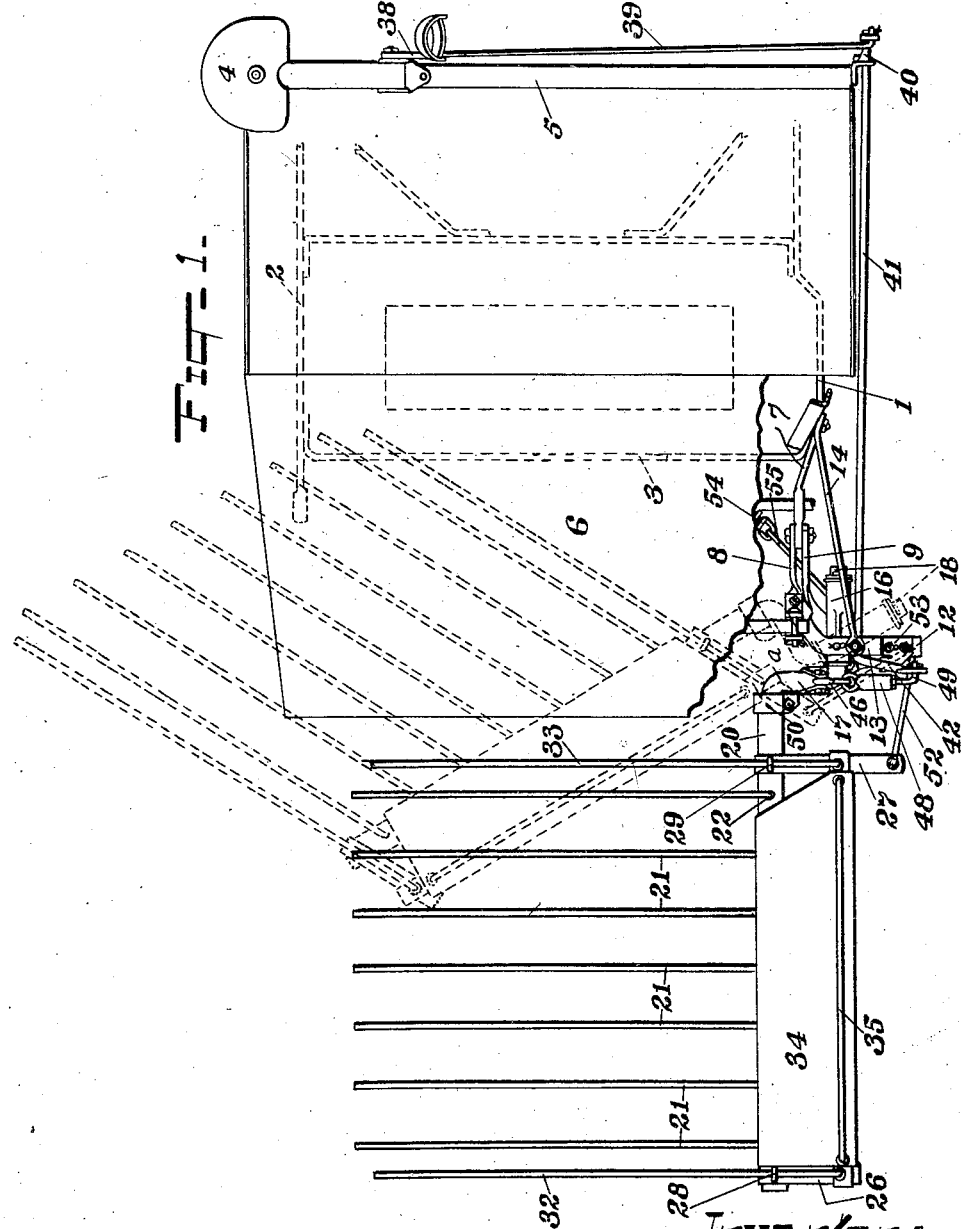
Witness;  
E. Wilderson
Inventor;  
Wilbur J. Coultas  
by W. C. Johnston  
Attorney.

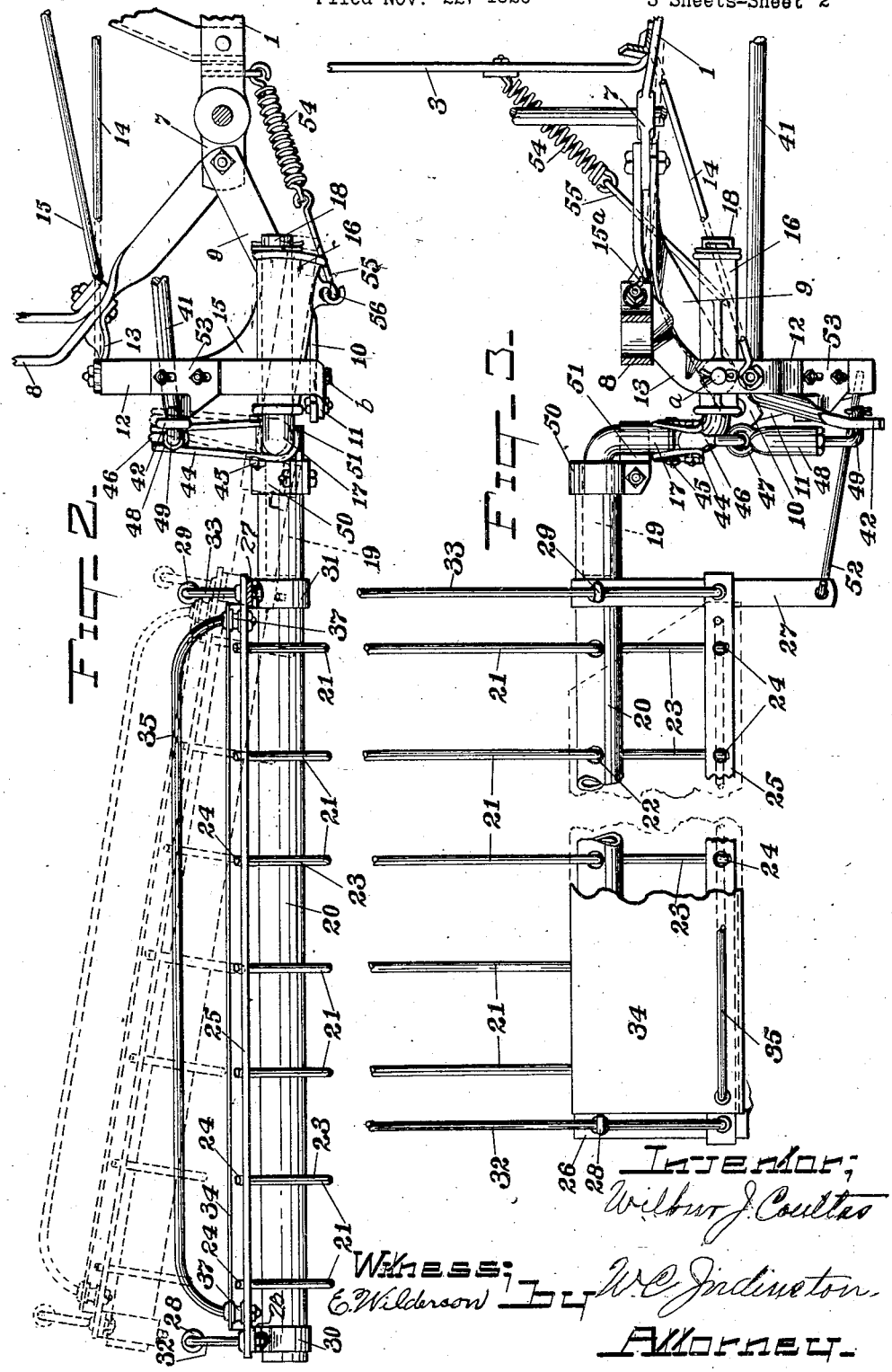

Oct. 11, 1927.
W. J. COULTAS
1,644,874
SHEAF CARRIER
Filed Nov. 22, 1920  3 Sheets-Sheet 3
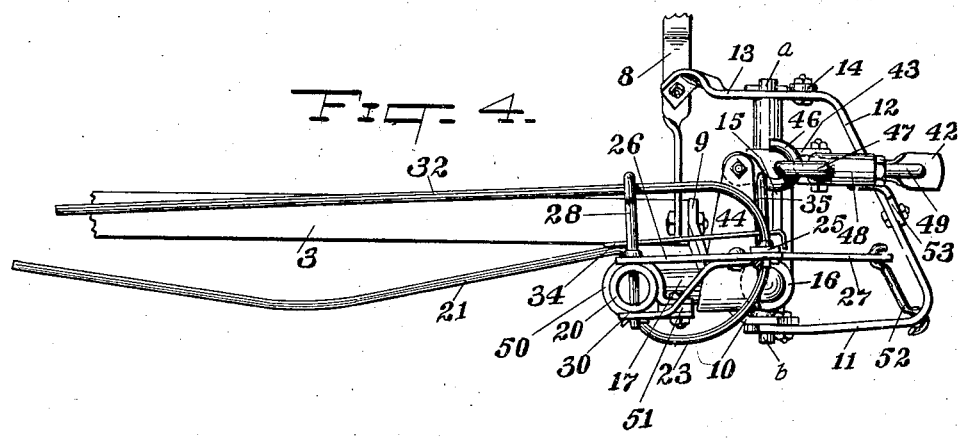
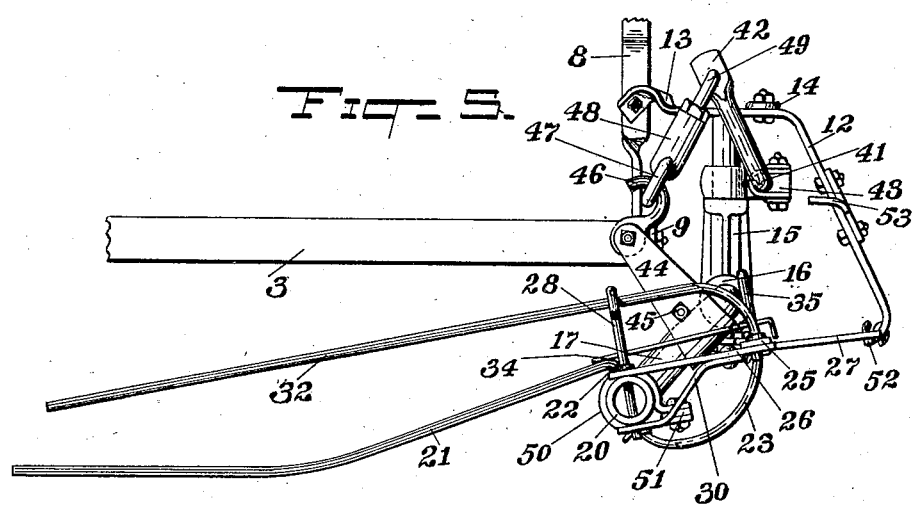

Patented Oct. 11, 1927.

1,644,874

UNITED STATES PATENT OFFICE.

WILBUR J. COULTAS, OF MOLINE, ILLINOIS, ASSIGNOR TO DEERE & COMPANY, OF MOLINE, ILLINOIS, A CORPORATION OF ILLINOIS.

SHEAF CARRIER.

Application filed November 22, 1920. Serial No. 425,663.

My invention relates to an accessory for harvesters and binders and belongs to that class of devices known as sheaf carriers commonly employed to receive bundles of grain from a harvester and hold them until the desired number has accumulated when the carrier can be actuated to deposit them upon the ground.

My invention has for its object the construction of a sheaf carrier which can be readily mounted on a harvester and binder and as readily removed therefrom, which is capable of sustaining the weight of accumulating bundles above the ground indefinitely and which can be readily tripped to deposit its load at the location desired.

Referring to the drawings in which similar numerals indicate identical parts—

Figure 1 is a plan view of my improved carrier mounted on a harvester and binder, sufficient of the structure of the latter being shown to illustrate the application of the invention.

Figure 2 is a front elevation.

Figure 3 is an enlarged plan view of the parts employed to support the carrier and to operate it.

Figure 4 is a stubbleward side elevation showing the carrier in position to receive bundles, and Figure 5 is a similar view showing the carrier in position when depositing bundles upon the ground.

In the drawings part of the stubbleward end of a harvester and binder is shown including frame bars 1 and 2, an end bar 3, a seat 4 mounted on a support 5, and a deck 6, part of the latter being broken away to show the mounting of my invention. The frame bar 1 has a stubbleward extension 7 to which is connected a bar 8 forming part of the deck support. Bolted to the bar 1, opposite to the bar 8, is an arm 9 which is bent to extend forwardly and terminates in a horizontal portion 10 to which is rigidly secured the lower arm 11 of a forwardly extending bracket 12 having an upper arm 13 rigidly secured to the bar 8. A brace rod 14 extends between the bracket 12 and the harvester frame and is rigidly secured to both, and a brace rod 15ª extends between the bar 8 and the harvester frame, both brace rods adding to the rigidity of the structure supporting the sheaf carrier.

A vertical member 15 is pivotally supported on the arms 11 and 13 at $a$ and $b$ and integral therewith is a sleeve 16. The sleeve 16 is horizontally disposed at a right angle to the line of draft, and its grainward end is enlarged in a vertical direction for a purpose hereinafter disclosed. A crank 17 is journaled by one arm 18 to rotate in the sleeve 16 in which it is secured by a pin or cotter in the end projecting from the sleeve. The second arm 19 of the crank 17 is parallel with the arm 18 and supports, journaled thereon, a tubular finger bar 20 carrying fingers 21 upon which the bound bundles from the binder are deposited. The arm 19, when the carrier is in receiving position, is rearward of the arm 18 and in the same horizontal plane, consequently when the crank is rocked to lower the carrier as hereinafter explained, the movement of the arm 19 is downward and forward.

To pivotally secure the fingers 21 on the bar 20 I bend them at 22, substantially at a right angle to the main part, the bent portions extending vertically through suitable perforations in the finger bar 20 and projecting in curves 23 which terminate in hooks 24, the latter engaging with a parallel bar 25 through openings therein.

The parallel bar 25 is supported on the finger bar 20 by links 26 and 27 which are pivotally mounted on the finger bar 20 and extend forwardly to pivotal connection with the parallel bar 25. Vertical standards 28 and 29 extend through the finger bar 20 and secure the links pivotally thereon, and on the lower end of the standards, beneath the finger bar 20, are pivotally secured links 30 and 31 which are bent upwardly to the links 26 and 27 to which they are respectively riveted. The standards 28 and 29 are provided with eyes at their upper ends through which extend guard fingers 32 and 33 on opposite sides of the carrier, to assist in retaining bundles upon the carrier until the latter is operated. The forward portion of the guard fingers 32 and 33 are bent downwardly and pass through the parallel bar 25 and the links 26 and 27, being held in place by cotters in the ends of the guard fingers beneath the links 26 and 27.

A table or plate 34 rests upon the fingers 21 and is secured upon the parallel bar 25 by a guard bar 35 which extends laterally of the carrier, parallel with the bar 25; the end portions of the guard bar 35 are bent downwardly and extend through perforations in the plate 34 and the parallel bar 25, and nuts on the ends of the guard bar 35, beneath the parallel bar 25, secure the parts together. Washers 37 on the guard bar 35 are interposed between the plate 34 and the bar 25 to give the plate 34 a slight rearward inclination.

Mounted on the seat bar 5, convenient to the seat 4, is a foot lever 38 to which is pivotally connected a forwardly extending rod 39 having its forward end connected to an arm 40 on the grainward end of a rod 41 which extends toward the sheaf carrier, the end adjacent thereto being bent to form an arm 42; this end of the rod 41 is mounted in a bearing 43 loosely supported on the vertical member 15. The foot lever 38 and connected rods 39 and 41 are old in the art and are such as commonly employed to operate dumping sheaf carriers.

Bent to extend upwardly on opposite sides of the central portion of the crank 17 is a standard 44 which is rigidly secured in place on the crank 17 by a bolt 45. Between the upper ends of the standard 44 is secured a hook 46 which engages with an eye 47 in a member 48 at the opposite end of which is a hook 49 secured in the end of the arm 42.

As previously stated the tubular finger bar 20 is journaled on the arm 19 of the crank 17, its rocking movement however is limited by a stop composed of a collar 50 clamped rigidly on the grainward end of the bar 20, and a part 51 rigidly secured to said collar and at a right angle thereto and extending beneath the central portion of the crank 17 with which its contacts to hold the sheaf carrier in a receiving position. The link 27 extends forwardly and has a perforation in its forward end with which a hooked end of a rod 52 (omitted from Figure 2) engages, the rod 52 extending to the arm 11 of the bracket 12 to which it is connected by a hook.

As shown in Figures 1, 2, 3 and 4, the carrier is in position to receive bundles from the harvester, and presuming it to be full and it is necessary to deposit the accumulated load upon the ground, the lever 38 is actuated rearwardly by the operator and through the connection of the rod 39 with the arm 40 on the rod 41 the latter is rocked to the position shown in Figure 5, and as the arm 42 of the rod 41 is connected to the standard 44 the movement of the rod 41 permits the crank 17 to rock downwardly and forwardly in its bearing in the sleeve 16. As these actions continue the fingers 21 contact with the ground and the stubble and as the harvester advances the fingers 21 are drawn from beneath the bundles leaving them upon the ground; the fingers 21 contact with the ground and stubble before the crank 17 reaches the limit of its downward and forward movement, consequently the finger bar 20 turns on the arm 19 of the crank 17 as the forward end of the carrier is lowered, the finger bar 20 moving bodily in an arc concentric with the axis of the arm 18 of the crank 17.

To return the carrier to a receiving position, the operator rocks the lever 38 forwardly, rocking the crank 17 rearwardly and upwardly and raising the forward part of the carrier until the part 51 contacts with the crank 17, the carrier then being raised from the ground to the receiving position. At the completion of the raising movement the arm 42 rests upon a stop 53 secured on the bracket 12, and the pivot of the member 48 on the arm 42 and the pivot of the hook 46 on the standard 44 are in the same horizontal plane and the member 48 is horizontal, consequently only a slight rearward movement of the lever 38 is required to cause the carrier to drop to the ground, moving bodily downwardly and rearwardly parallel with the ground by the rocking action of the crank 17.

When an obstruction is met the carrier will fold rearwardly, as shown in dotted lines in Figure 1, the vertical member 15 pivoting in its bearings on the bracket 12; when the obstruction is passed the carrier is returned to its operative position by the tension of a spring 54 one end of which is secured to the frame bar 3 and the opposite end is connected to a link 55 hooked in an eye 56 on the underside of the sleeve 16.

To permit the carrier to ride over an obstruction, with which it may contact, and without effort of the driver, I enlarge the sleeve vertically at its grainward end whereby the carrier is capable of rocking vertically toward the harvester as shown in dotted lines in Figure 2.

The fingers 21, 32 and 33 are retained in parallel relation in all positions by the rod 52 connected to the immovable bracket 12 and to the forward end of the link 27 pivotally mounted on the finger bar 20 and pivotally connected with the parallel bar 25.

What I claim is—

1. The combination with a harvester frame, of a bracket secured on the frame, a supporting member pivoted on said bracket, a crank horizontally and movably journaled on said member, a sheaf carrier journaled on said crank, and means operating to hold said crank from movement and the sheaf carrier in receiving position, said means operable to release said crank and sheaf carrier to move bodily downwardly and forwardly.

2. The combination with a harvester frame, of a bracket secured on the frame, a supporting member pivoted on said bracket, a crank having its arms horizontally disposed, one of said arms journaled on said member, a sheaf carrier movably journaled on a second crank arm, and means operating to hold said crank from movement and the sheaf carrier in receiving position, said means operable to release said crank and sheaf carrier to move bodily downwardly and forwardly.

3. The combination with a harvester frame, of a bracket secured thereon, a vertically disposed supporting member pivoted on the bracket and having a substantially horizontal sleeve, a crank having an arm movably journaled in said sleeve and a second arm parallel to the first arm and normally in the same horizontal plane, a sheaf carrier journaled on the second arm, and means operating to hold said crank from movement and the sheaf carrier in receiving position, said means operable to release said crank and sheaf carrier to move bodily downwardly and forwardly.

4. The combination with a harvester frame, of a bracket secured thereon, a vertically disposed supporting member pivotally mounted on said bracket and having a substantially horizontal sleeve, a crank having an arm journaled in said sleeve and a second arm parallel to the first arm and normally in the same horizontal plane, a sheaf carrier journaled on the second arm, and means operating to hold said crank from movement and the sheaf carrier in receiving position, said means operable to release said crank and sheaf carrier to move bodily downwardly and forwardly and to raise said crank and sheaf carrier back to normal position.

5. The combination with a harvester frame, of a bracket secured thereon, a supporting member pivoted vertically on the bracket and having a substantially horizontal sleeve, a crank having an arm journaled in said sleeve and a second arm parallel to the first arm rearward thereof and normally in the same horizontal plane, a sheaf carrier including a tubular bar journaled on the second arm, means to hold said carrier in receiving position, and means to release said holding means to permit the first mentioned arm to turn rearwardly and lower the second arm and sheaf carrier bodily forwardly and operative to turn the first mentioned arm in a reverse direction to raise the second arm and sheaf carrier.

6. The combination with a harvester frame, of a bracket secured on the frame, a supporting member pivoted vertically on said bracket, a crank having an arm journaled in said member and a second arm parallel with the first arm and normally in the same horizontal plane, a sheaf carrier journaled on the second arm, means to hold said carrier in a receiving position, means operative to release said holding means and permit the first mentioned arm to turn and lower the second arm and sheaf carrier bodily forwardly and operable to reverse the movement of the first mentioned arm to raise the second arm and sheaf carrier, and means to limit a rocking movement of the sheaf carrier on the second arm when the carrier is raised.

7. The combination with a harvester frame, of a bracket secured on the frame, a supporting member pivoted vertically on said bracket, a horizontally disposed crank having an arm journaled in said member and a rearwardly positioned second arm, a sheaf carrier including a tubular bar journaled on the second arm, means to hold said carrier in receiving position, means operative to release said holding means to permit said first mentioned arm to turn and lower the second arm and the sheaf carrier bodily, said tubular bar turning on the second arm rearwardly and upwardly relative to said arm as the carrier contacts with the ground, said holding means operable to reverse the movement of the crank to raise the carrier, and a stop on said bar adapted to contact with the underside of said crank.

WILBUR J. COULTAS.